United States Patent
Zhou et al.

(10) Patent No.: US 10,199,643 B2
(45) Date of Patent: Feb. 5, 2019

(54) NEGATIVE ELECTRODE FOR LITHIUM-BASED BATTERIES

(71) Applicant: GM GLOBAL TECHNOLOGY OPERATIONS LLC, Detroit, MI (US)

(72) Inventors: Weidong Zhou, Austin, TX (US); Xingcheng Xiao, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 253 days.

(21) Appl. No.: 14/964,545

(22) Filed: Dec. 9, 2015

(65) Prior Publication Data

US 2016/0172665 A1  Jun. 16, 2016

Related U.S. Application Data

(60) Provisional application No. 62/092,548, filed on Dec. 16, 2014.

(51) Int. Cl.
*H01M 4/36* (2006.01)
*H01M 4/587* (2010.01)
*H01M 4/38* (2006.01)
*H01M 4/04* (2006.01)
*H01M 4/62* (2006.01)
*H01M 10/0525* (2010.01)
*H01M 4/02* (2006.01)
*H01M 10/0568* (2010.01)
*H01M 10/0569* (2010.01)

(52) U.S. Cl.
CPC ......... *H01M 4/366* (2013.01); *H01M 4/0402* (2013.01); *H01M 4/0471* (2013.01); *H01M 4/386* (2013.01); *H01M 4/587* (2013.01); *H01M 4/622* (2013.01); *H01M 10/0525* (2013.01); *H01M 10/0568* (2013.01); *H01M 10/0569* (2013.01); *H01M 2004/027* (2013.01)

(58) Field of Classification Search
None
See application file for complete search history.

(56) References Cited

U.S. PATENT DOCUMENTS 8,663,840 B2  3/2014  Nazri et al.
8,974,946 B2  3/2015  Cai et al.
(Continued)

FOREIGN PATENT DOCUMENTS

CN  1800094 A  7/2006
CN  103456928 A  12/2013
(Continued)

OTHER PUBLICATIONS

Machine Translation of CN1800094 published Jul. 2006 (Year: 2006).*

(Continued)

*Primary Examiner* — Wyatt P McConnell
(74) *Attorney, Agent, or Firm* — Harness, Dickey & Pierce, P.L.C.

(57) ABSTRACT

A negative electrode includes an active material. The active material includes a silicon-based core and a two-dimensional, layered mesoporous carbon coating in continuous contact with the silicon-based core. The two-dimensional, layered mesoporous carbon coating is capable of expanding and contracting with the silicon-based core. The negative electrode also includes a binder.

20 Claims, 5 Drawing Sheets

(56) References Cited

U.S. PATENT DOCUMENTS

| | | |
|---|---|---|
| 8,999,584 B2 | 4/2015 | Jiang et al. |
| 9,028,565 B2 | 5/2015 | Huang |
| 9,093,705 B2 | 7/2015 | Xiao et al. |
| 9,123,939 B2 | 9/2015 | Xiao et al. |
| 9,142,830 B2 | 9/2015 | Xiao et al. |
| 9,153,819 B2 | 10/2015 | Huang et al. |
| 9,160,036 B2 | 10/2015 | Yang et al. |
| 9,350,046 B2 | 5/2016 | Huang |
| 9,362,551 B2 | 6/2016 | Sachdev et al. |
| 9,362,552 B2 | 6/2016 | Sohn et al. |
| 9,412,986 B2 | 8/2016 | Huang |
| 9,455,430 B2 | 9/2016 | Huang et al. |
| 9,537,144 B2 | 1/2017 | Huang et al. |
| 2002/0009646 A1* | 1/2002 | Matsubara ............ H01M 2/32 429/231.8 |
| 2012/0231321 A1 | 9/2012 | Huang et al. |
| 2013/0284338 A1 | 10/2013 | Xiao et al. |
| 2014/0272558 A1 | 9/2014 | Xiao et al. |
| 2015/0064552 A1 | 3/2015 | Huang et al. |
| 2016/0111721 A1 | 4/2016 | Xiao et al. |

FOREIGN PATENT DOCUMENTS

| | | |
|---|---|---|
| CN | 105702941 A | 6/2016 |
| DE | 102015121806 A1 | 6/2016 |

OTHER PUBLICATIONS

First Office Action for Chinese Application No. 201511036088.3 dated Oct. 16, 2017; 7 pages.

\* cited by examiner

NEGATIVE ELECTRODE FOR LITHIUM-BASED BATTERIES

CROSS-REFERENCE TO RELATED APPLICATIONS

This application claims the benefit of U.S. Provisional Application Ser. No. 62/092,548, filed Dec. 16, 2014, which is incorporated by reference herein in its entirety.

BACKGROUND

Secondary, or rechargeable, lithium ion batteries or lithium-sulfur batteries are often used in many stationary and portable devices, such as those encountered in the consumer electronic, automobile, and aerospace industries. The lithium class of batteries has gained popularity for various reasons, including a relatively high energy density, a general nonappearance of any memory effect when compared to other kinds of rechargeable batteries, a relatively low internal resistance, and a low self-discharge rate when not in use. The ability of lithium batteries to undergo repeated power cycling over their useful lifetimes makes them an attractive and dependable power source.

SUMMARY

An example of a negative electrode includes an active material. The active material includes a silicon-based core and a two-dimensional, layered mesoporous carbon coating in continuous contact with the silicon-based core. The two-dimensional, layered mesoporous carbon coating is capable of expanding and contracting with the silicon-based core. The negative electrode also includes a binder.

Examples of the negative electrode disclosed herein may be included in a lithium ion battery or a lithium-sulfur battery.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Figure 1:
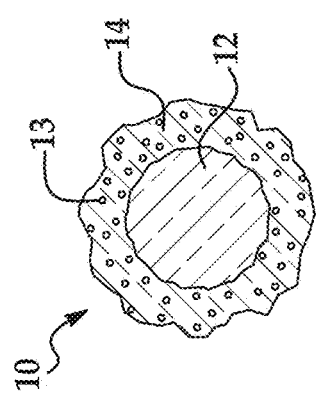
FIG. 1 is a cross-sectional view of an example of the active material used in the negative electrode disclosed herein.

The high theoretical capacity (e.g., 4200 mAh/g) of silicon renders it desirable for use as a negative electrode active material in lithium-based batteries. However, it has been found that negative electrode active materials (e.g., silicon particles) with high specific capacities also have large volume expansion and contraction during charging/discharging of the lithium-based battery. The large volume change (e.g., about 300%) experienced by the negative electrode active material during charging/discharging causes the negative electrode active material to fracture, decrepitate, or otherwise mechanically degrade, which results in a loss of electrical contact and poor life cycling. Poor cycling performance often includes a large capacity fade, which may result from the breakdown of contact between the negative electrode active material and conductive fillers in the negative electrode due to the large volume change.

In the examples disclosed herein, it has been found that one way to improve the cycling performance of the silicon-based active material is by encapsulating a silicon-based core in a two-dimensional, layered mesoporous carbon coating. The two-dimensional, layered mesoporous carbon coating is flexible and elastic, which allows the mesoporous carbon coating to expand and contract with the silicon-based core during battery cycling. Thus, the mesoporous carbon coating stays in continuous contact with the silicon-based core when the volume of the silicon-based core expands during charging of the negative electrode, and when the volume of the silicon-based core contracts during discharging of the negative electrode. The flexibility/elasticity of the dimensional, layered mesoporous carbon coating enables it to recover its original shape when there is no external force (e.g., the force of the silicon-based core) applied thereto.

The ability of the two-dimensional, layered mesoporous carbon coating to expand and contract with the silicon-based core without being degraded provides the silicon-based core with a protective surface throughout the discharge and charge processes. The two-dimensional, layered mesoporous carbon coating is less susceptible (than silicon alone) to fracturing, decrepitating, or mechanical degradation, and thus actually aids in maintaining the integrity of the silicon-based core throughout battery cycling. As a result, the negative electrode disclosed herein has an improved cycling performance, which in turn improves the cycling performance and stability of the lithium battery.

In addition, the two-dimensional, layered mesoporous carbon coating is electrically conductive and thus enhances the electrical conductivity of the active material. In some instances, the two-dimensional, layered mesoporous carbon coating may function as the conductive filler in the negative electrode. Since the mesoporous carbon coating is electrically conductive and, as previously described, remains in continuous contact with the silicon-based core, the negative electrode may, in some instances, be prepared without any additional conductive filler.

Furthermore, it has been found that the life cycle of both lithium-sulfur and lithium ion batteries may be limited by the migration, diffusion, or shuttling of certain species from the positive electrode during the battery discharge process, through the porous polymer separator, to the negative electrode.

For a lithium-sulfur battery, the life cycle may be limited by the migration, diffusion, or shuttling of lithium-polysulfide intermediates ($LiS_x$, where x is $2<x<8$) from the positive electrode through the porous polymer separator, to the negative electrode during the battery discharge process. The lithium-polysulfide intermediates generated at the sulfur-based positive electrode are soluble in the electrolyte, and can migrate to the negative electrode where they react with the lithium in the negative electrode in a parasitic fashion to generate lower-order lithium-polysulfide intermediates. These lower-order lithium-polysulfide intermediates diffuse back to the positive electrode and regenerate the higher-orders of lithium-polysulfide intermediates. As a result, a shuttle effect takes place. This effect leads to decreased sulfur utilization, self-discharge, poor cycleability, and reduced Coulombic efficiency of the battery. Without being bound to any theory, it is believed that even a small amount of lithium-polysulfide intermediates forms an insoluble molecule, such as dilithium sulfide ($Li_2S$), that can permanently bond to the negative electrode. This may lead to parasitic loss of active lithium at the negative electrode, which prevents reversible electrode operation and reduces the useful life of the lithium-sulfur battery.

Similarly, it has been found that lithium ion batteries are deleteriously affected by the dissolution of transition metal cations from the positive electrode, which results in accelerated capacity fading, and thus loss of durability in the battery. The transition metal cations migrate from the positive electrode to the negative electrode of the battery, leading to its "poisoning". For instance, a silicon-based negative electrode may be poisoned by $Mn^{+2}$, $Mn^{+3}$, or $Mn^{+4}$ cations that dissolve from spinel $Li_xMn_2O_4$ of the positive electrode. For instance, the $Mn^{+2}$ cations may migrate through the battery electrolyte and porous polymer separator, and deposit onto the silicon-based negative electrode. When deposited onto the silicon-based negative electrode, the $Mn^{+2}$ cations become Mn metal. A relatively small amount (e.g., 90 ppm) of Mn metal can poison the negative electrode and prevent reversible electrode operation, thereby deleteriously affecting the useful life of the battery. The deleterious effect of the Mn deposited at the negative electrode is significantly enhanced during battery exposure to above-ambient temperatures (>40° C.), irrespective of whether the exposure occurs through mere storage (i.e., simple stand at open circuit voltage in some state of charge) or during battery operation (i.e., during charge, during discharge, or during charge-discharge cycling).

In the negative electrode disclosed herein, the two-dimensional, layered mesoporous carbon coating prevents the silicon-based core (which may have lithium ions therein) of the active material from coming into direct contact with the electrolyte in the battery. This prevents the lithium ions housed in the silicon-based core of the active material from reacting with the electrolyte and/or potentially deleterious compounds, such as $S_x$ polysulfides in the lithium-sulfur battery or transition metal cations in the lithium ion battery. As a result, the mesoporous carbon coating can mitigate the shuttle effect or poisoning effect, and in turn can improve the efficiency and life cycle of the battery.

Figure 2:
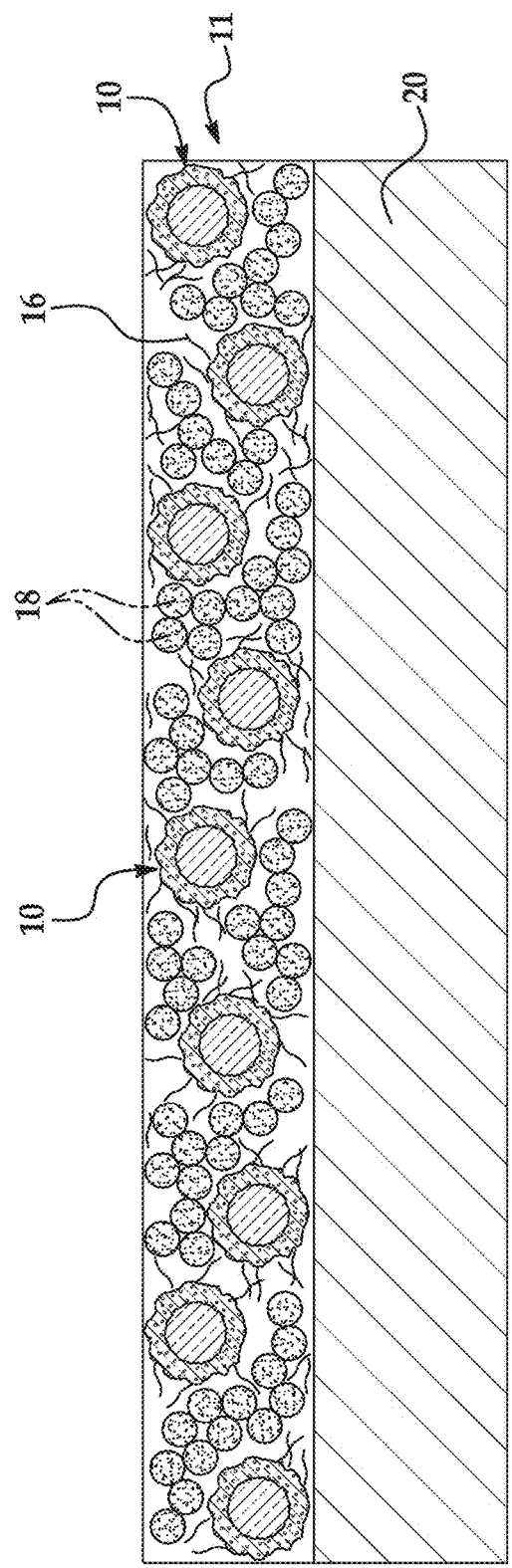
FIG. 2 is a cross-sectional view of an example of a negative electrode on a current collector.

Referring now to FIG. 1, an example of an active material 10 used in the negative electrode (reference numeral 11 in FIG. 2) is depicted. The active material 10 includes the silicon-based core 12. The active material 10 also includes the two-dimensional, layered mesoporous carbon coating 14 encapsulating the silicon-based core 12. The coating 14 is considered two-dimensional because of the length of the coating 14 (i.e., measured around the silicon-based core 12) and the thickness of the coating 14 (i.e., measured from a surface of the core 12 to a surface of the coating 14). The silicon-based core 12 has a diameter ranging from about 5 nm to about 50 μm. The mesoporous carbon coating 14 encapsulating the silicon core 12 has a total thickness ranging from about 5 nm to about 250 nm. In an example, the mesoporous carbon coating 14 may range from a couple layers thick to hundreds of layers thick (e.g., from about 2 layers to about 500 layers thick). Each individual layer of the mesoporous carbon coating 14 is about 0.5 nm thick.

The silicon-based core 12 may be formed of silicon, silicon dioxide ($SiO_2$), silicon suboxide ($SiO_x$, where x is $0<x<2$), a silicon alloy, and a combination thereof. Some examples of the silicon alloy include silicon-containing binary, ternary, or quaternary alloys, such as Si—Sn, Si—Al, Si—Fe, SiSnFe, SiSnAl, SiFeCo, SiAlFeSn, etc. It is to be understood that the silicon alloys may have different ratios of the respective elements. For example, the silicon alloy may be $Si_{(1-x)}Sn_x$, where ($0<x<1$). The silicon-based core 12 may be a single particle or a plurality of particles. As previously noted, the silicon-based core 12 has a diameter ranging from about 5 nm to about 50 μm, and thus may be a nanoparticle or a microparticle. In an example, the silicon-based core 12 is made up of a powder (e.g., silicon or silicon alloy nano-powders). In addition, the silicon-based core 12 may have a different morphology, such as spherical particles, nanotubular structures, nanofibers, porous structures, etc. It is to be understood that the silicon-based core 12 may also be a multi-layered material, including a second silicon-based core material positioned on a first silicon-based core material. In an example, the silicon-based core 12 may include a silicon base material and a silicon dioxide coating thereon.

The mesoporous carbon coating 14 may be formed on the silicon-based core 12 by mixing the silicon-based core 12 and a mesoporous polymer precursor in the presence of a catalyst. The mixing of the silicon-based core 12 and the mesoporous polymer precursor with the catalyst causes the mesoporous polymer precursor to polymerize in situ on the silicon-based core 12, thereby forming a two-dimensional mesoporous polymer coating that conformally coats the silicon-based core 12. By conformally coats, it means that the polymer that is formed encapsulates or surrounds the silicon-based core 12.

In an example, the mesoporous polymer precursor may be a monomer combination that provides a source of carbon. Some examples of monomer combinations that may be used include triethynylbenzene and diiodobenzene, or triethynylbenzene and dibromobenzene, or diethynylbenzene and triiodobenzene, or diethynylbenzene and tribromobenzene. Each of these combinations of monomers is capable of undergoing a Sonogashira coupling reaction. In another example, p-divinylbenzene and tribromobenzene may be used as the monomers. This reaction is known as a Hecking coupling reaction. In yet another example, benzene-1,4-diboronic acid and tribromobenzene may be used as the monomers. This reaction is known as a Suzuki coupling reaction. In an example, a mixture of triethynylbenzene and diiodobenzene is used to form the mesoporous polymer coating (not shown in FIG. 1). It is to be understood that the mesoporous polymer precursor is not a carbon residue forming material (e.g., heavy aromatic residues from petroleum, chemical process pitches; lignin from the pulp industry; phenolic resins; and carbohydrate materials such as sugars and polyacrylonitriles).

The catalyst initiates a coupling reaction. In an example, the catalyst may be a palladium(0) based catalyst, a palladium(II) based catalyst, a copper based catalyst, or a nickel based catalyst. A suitable catalyst combination includes tetrakis(triphenylphosphine)palladium(0) (Pd(PPh$_3$)$_4$) and copper iodide. Another suitable example includes bis(triphenylphosphine)palladium(II) dichloride (PdCl$_2$(PPh$_3$)$_2$.

In an example, the coupling reaction may be performed by adding the catalyst(s), the silicon-based cores 12, and the monomer(s) (i.e., the mesoporous polymer precursors) to an organic solvent to form a mixture. Some examples of the solvent include dimethylformamide (DMF), tetrahydrofuran (THF), and other ether based solvents known to the skilled artisan.

In one instance, the reaction may occur in ambient conditions. For example, ambient conditions may be used when a palladium(II) catalyst is used. It is to be understood that ambient conditions include room temperature (e.g., from about 18° C. to about 25° C.) and an atmospheric pressure. In another example, the mixture may be placed in an inert environment in order to prevent any undesirable side reactions with oxygen from taking place (not shown in FIG. 1). Any of the previously described reactions (e.g., Sonogashira coupling reaction, Hecking coupling reaction, Suzuki coupling reaction) may take place in the inert environment. When a nickel based catalyst is used, the reaction takes place in the inert environment. In an example, argon gas, nitrogen gas, or any other inert gas may be used to create the inert environment to avoid undesired oxidation at elevated temperatures.

The coupling reaction may occur at a temperature ranging from about 18° C. (e.g., room temperature) to about 100° C. depending on the type of solvent that is used. For example, the temperature may be up to about 80° C. when THF is used as the solvent, and the temperature may be up to about 100° C. when DMF is used as the solvent. The coupling reaction may occur for a time ranging from about 1 hour to about 10 hours. It is to be understood that the longer the reaction occurs, the thicker the coating may be on the silicon-based cores 12.

In one example, a Sonogashira coupling reaction may be used to prepare the mesoporous carbon coating 14. A mixture of triethynylbenzene and diiodobenzene are added to THF as the solvent. A combination of tetrakis(triphenylphosphine)palladium(0) and copper iodide are also added, as the catalysts, to the solvent to form a mixture. The silicon-based cores 12 are also added to the mixture. A flow of nitrogen gas may be introduced through the mixture to create the inert environment. The mixture is heated to 100° C. for a time ranging from about 1 hour to about 10 hours, and the following coupling reaction (I) occurs:

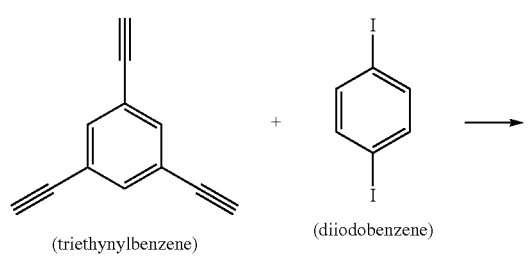

(triethynylbenzene)   (diiodobenzene)

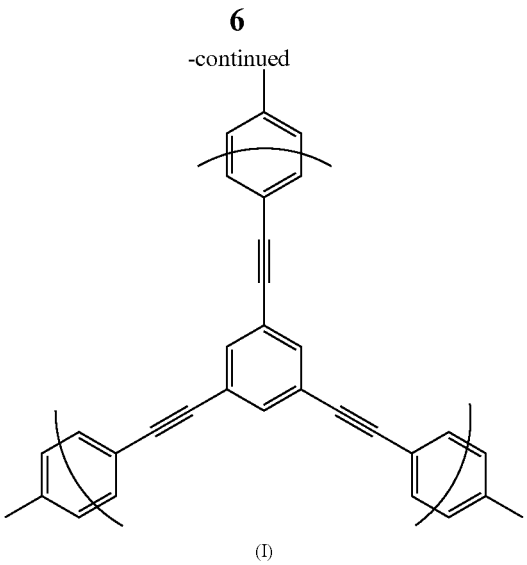

(I)

In the coupling reaction (I), the alkyne of the triethynylbenzene and the aryl halide of the diiodobenzene will form a carbon-carbon bond in the presence of the tetrakis(triphenylphosphine)palladium(0) and copper iodide catalysts. The monomer triethynylbenzene contains respective alkynes in three different directions. These groups will polymerize in situ in each of the three different directions, thereby forming a cross-linked structure that conformally coats the silicon-based core 12.

After the two-dimensional, layered mesoporous polymer coating conformally coats the silicon-based core 12, the polymer-coated silicon-based core 12 may be heat treated. In an example, the heat treatment may occur at a temperature ranging from about 300° C. to about 900° C. The heat treatment causes the two-dimensional, layered mesoporous polymer coating to carbonize. Carbonization of the polymer coating forms the two-dimensional, layered mesoporous carbon coating 14 on the silicon-based core 12.

It is to be understood that the pores of the two-dimensional, layered mesoporous polymer coating form pores 13 throughout the mesoporous carbon coating 14. The pores 13 are present in the various layers of the coating 14, and while the pores 13 are shown schematically in FIG. 1, the pores 13 may be difficult to see in a cross-section of the actual coating 14. Each pore 13 of the mesoporous carbon coating 14 may have a diameter ranging from about 2 nm to about 50 nm. It is to be understood that the pores 13 facilitate lithium ion transport through the mesoporous carbon coating 14. It is believed that the rate capability of the negative electrode 11 may be improved (compared to a negative electrode including the silicon core alone) because of mesopores 13 and because of the electrical conductivity of the mesoporous carbon coating 14.

The active material 10 may be used in the negative electrode 11. Examples of the method for making the negative electrode 11 will now be discussed in reference to FIG. 2.

In examples of preparing the negative electrode 11, the active material 10 is mixed with other negative electrode components to form a dispersion or slurry. Examples of the other negative electrode components may include the binder 16 and, in some instances, the conductive filler 18.

In an example of preparing the dispersion or slurry, the binder 16 is mixed into a solvent to form a solution. Examples of the binder 16 may include polyvinylidene fluoride (PVdF), polyethylene oxide (PEO), an ethylene propylene diene monomer (EPDM) rubber, carboxymethyl cellulose (CMC)), styrene-butadiene rubber (SBR), styrene-butadiene rubber carboxymethyl cellulose (SBR-CMC), polyacrylic acid (PAA), cross-linked polyacrylic acid-polyethylenimine, polyimide, or any other suitable binder material known to skilled artisans. Other suitable binders include polyvinyl alcohol (PVA), sodium alginate, or other water-soluble binders.

Suitable examples of the solvent that may be mixed with the binder 16 to form the solution may include a polar aprotic solvent. Examples of suitable polar aprotic solvents include dimethylacetamide (DMAc), N-methyl-2-pyrrolidone (NMP), dimethylformamide (DMF), dimethylsulfoxide (DMSO), or another Lewis base, or combinations thereof. When a water soluble binder, such as sodium alginate, is used, the solvent may be water.

In instances where a conductive filler 18 is used, the conductive filler 18 may be a high surface area carbon, such as acetylene black (i.e., carbon black). Other examples of suitable conductive fillers 18 include graphene, graphite, carbon nanotubes, and/or carbon nanofibers. In yet another example, a combination of conductive fillers 18 is used, such as carbon black and carbon nanofibers. The conductive filler 18 may be included to ensure electron conduction between a negative-side current collector (i.e., support 20) and the active material 10. The conductive filler 18 may also be excluded because the coating 14 is conductive and thus can function as the conductive filler.

In an example, the dispersion/slurry includes the polar aprotic solvent, the binder 16, the active material(s) 10, and, in some instances, the conductive filler 18. The amount of polar aprotic solvent that is included in the dispersion/slurry will depend upon the concentration of the binder 16 solution and the amount of binder solution used in the slurry. In one example of the dispersion/slurry, the amount of the active material 10 ranges from about 70 wt % to about 95 wt % (based on total solid wt % of the dispersion/slurry), the amount of the conductive filler 18 ranges from about 0 wt % to about 30 wt % (based on total solid wt % of the dispersion/slurry), and the amount of the binder 16 ranges from about 5 wt % to about 30 wt % (based on total solid wt % of the dispersion/slurry).

After all the components are added to form the dispersion/slurry, the dispersion may be mixed by milling. Milling aids in transforming the dispersion/slurry into a coatable mixture. Low-shear milling or high-shear milling may be used to mix the dispersion/slurry. The dispersion/slurry milling time ranges from about 10 minutes to about 20 hours depending on the milling shear rate. In an example, a planetary mixer is used for about 3 hours to mill the dispersion/slurry.

The dispersion is then deposited onto a support 20. In an example, the support 20 is a negative-side current collector. It is to be understood that the support 20 may be formed from copper or any other appropriate electrically conductive material known to skilled artisans. The support 20 that is selected should be capable of collecting and moving free electrons to and from an external circuit connected thereto.

The dispersion may be deposited using any suitable technique. As examples, the dispersion may be cast on the surface of the support 20, or may be spread on the surface of the support 20, or may be coated on the surface of the support 20 using a slot die coater.

The deposited dispersion may be exposed to a drying process in order to remove any remaining solvent. Drying may be accomplished using any suitable technique. Drying may be performed at an elevated temperature ranging from about 60° C. to about 200° C. In some examples, vacuum may also be used to accelerate the drying process. As one example of the drying process, the deposited dispersion may be exposed to vacuum at about 120° C. for about 12 to 24 hours.

The drying process results in a coating formed on the surface of the support 20. This coating is the negative electrode 11. In an example, the thickness of the dried slurry (i.e., coating) ranges from about 5 µm to about 500 In another example, the thickness of the dried slurry (i.e., coating) ranges from about 10 µm to about 100 µm. The thickness of the negative electrode 11 may be slightly reduced when compared to the thickness of the dried dispersion that forms the negative electrode 11. The reduced thickness of the negative electrode 11 may be due, in part, to shrinkage caused by the heating.

As such, after drying the dispersion on the support 20, the negative electrode 11 is formed, which includes the active material 10 (i.e., the silicon-based core 12 with the mesoporous carbon coating 14), the binder 16, and, in some instances, the conductive filler 18.

During the formation of the negative electrode 11, the solvent(s) is/are removed, and thus the resulting electrode 11 includes from about 70 wt % to about 95 wt % (based on total wt % of the negative electrode 11) of the active material 10, from about 5 wt % up to 30 wt % (based on total wt % of the negative electrode 11) of the binder 16, and, from 0 wt % up to 30 wt % (based on total wt % of the negative electrode 11) of the conductive filler 18.

In some examples, the negative electrode 11 may be paired with a lithium electrode. In an example, the negative electrode 11 including the active materials 10 may be paired with lithium metal to form a half-cell.

Prior to being used in the lithium ion battery 30 (FIG. 3) or the lithium-sulfur battery 40 (FIG. 4, which may also be known as a silicon-sulfur battery), the examples of the negative electrode 11 disclosed herein may be pre-lithiated. Pre-lithiation may be particularly desirable when the negative electrode is to be used in the lithium-sulfur battery 40.

In an example, the negative electrode is pre-lithiated using a lithium-silicon (Li—Si) half-cell method. More specifically, the Li—Si half-cell is assembled using the silicon-based negative electrode 11. The Li—Si half-cell is soaked in a pre-lithiation electrolyte.

Examples of the pre-lithiation electrolyte include lithium metal or a lithium salt dissolved in a solvent or solvent mixture. As examples, the lithium salt may be $LiPF_6$, $LiBF_4$, $LiClO_4$, $LiN(CF_3SO_2)_2$ (LiTFSI, or (Lithium Bis(Trifluoromethanesulfonyl)Imide)), $LiB(C_2O_4)_2$ (LiBOB), $LiBF_2(C_2O_4)$ (LiODFB), $LiPF_4(C_2O_4)$ (LiFOP), $LiNO_3$, $LiN(SO_2F)_2$ (LiFSI), $LiPF_3(C_2F_5)_3$ (LiFAP), $LiPF_4(CF_3)_2$, $LiPF_3(CF_3)_3$, and combinations thereof. In an example, the lithium salt in the pre-lithiation electrolyte is 1M $LiPF_6$.

In an example, the lithium salt or the lithium metal is dissolved in a solvent mixture of dimethoxyethane (DME) and fluoroethylene carbonate (FEC). The volume to volume ratio of the solvents (DME to FEC) ranges from 10 to 1 to 1 to 10. In an example, the volume to volume ratio of DME to FEC is 3 to 1. It has been found that using FEC as a co-solvent forms a desirable solid electrolyte interphase (SEI) layer (not shown) on the exposed surface(s) of the silicon-based negative electrode 11 during the pre-lithiation process. The FEC is active and readily decomposes during pre-lithiation to form the SEI layer. In another example, diethylene glycol (DEC) and FEC may be used as the solvent mixture to dissolve the lithium metal. The volume to volume ratio of these solvents (DEC to FEC) also ranges from 10 to 1 to 1 to 10. In an example, the volume to volume ratio of DEC to FEC is 3 to 1.

A voltage potential is applied to the half-cell, which causes at least some component in the electrolyte to decompose. The decomposition product deposits on the exposed surface(s) of the negative electrode 11 to form the SEI layer. The decomposition product may be LiF, $Li_2CO_3$, $Li_xPF_yO_z$, F-replaced Lithium Ethylene Di Carbonate (F-LEDC), an unsaturated polyolefin, etc. The voltage potential is applied for a time sufficient to form the SEI layer. In an example, when a higher current is used, the exposure time may be shorter. Similarly, when a lower current is used, the exposure time may be longer. The SEI layer may have a thickness of about 10 nm or less.

In another example, the negative electrode 11 may be pre-lithiated by short circuiting lithium-silicon having the previously described pre-lithiation electrolyte positioned therebetween. This may be accomplished for a time period ranging from about 1 hour to about 24 hours.

During pre-lithiation, lithium ions are dissolved (or de-plated) from lithium metal and are able to diffuse into the negative electrode 11, thereby lithiating the negative electrode 11. It is to be understood that only the lithium ions may diffuse through the carbon coating 14 to alloy with the silicon-based core 12 of the active material 10. Other components, such as the electrolyte, anions, etc. cannot pass through the carbon coating 14.

Figure 3:
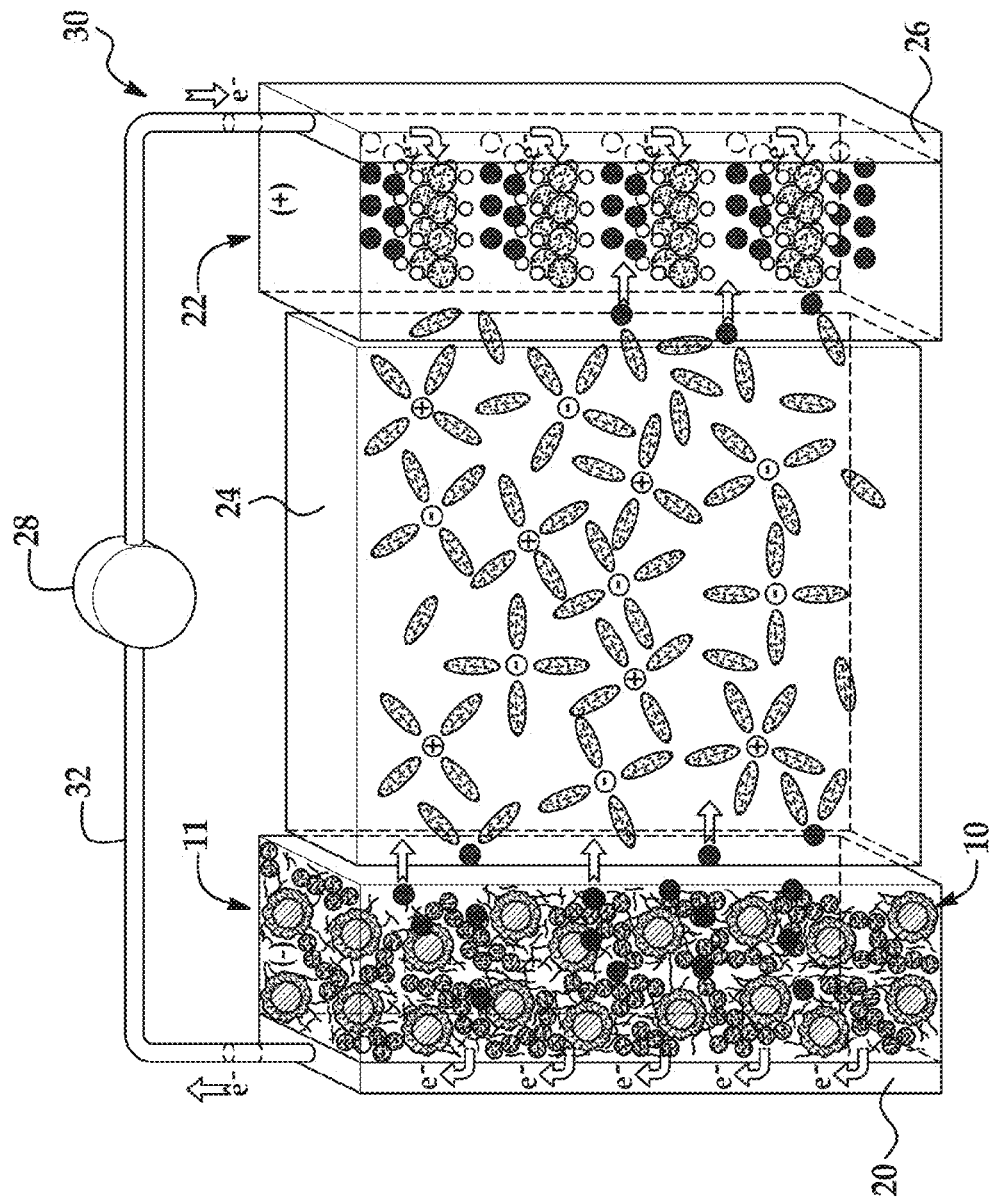
FIG. 3 is a perspective, schematic view of an example of a lithium ion battery, including an example of the negative electrode disclosed herein.
Figure 4:
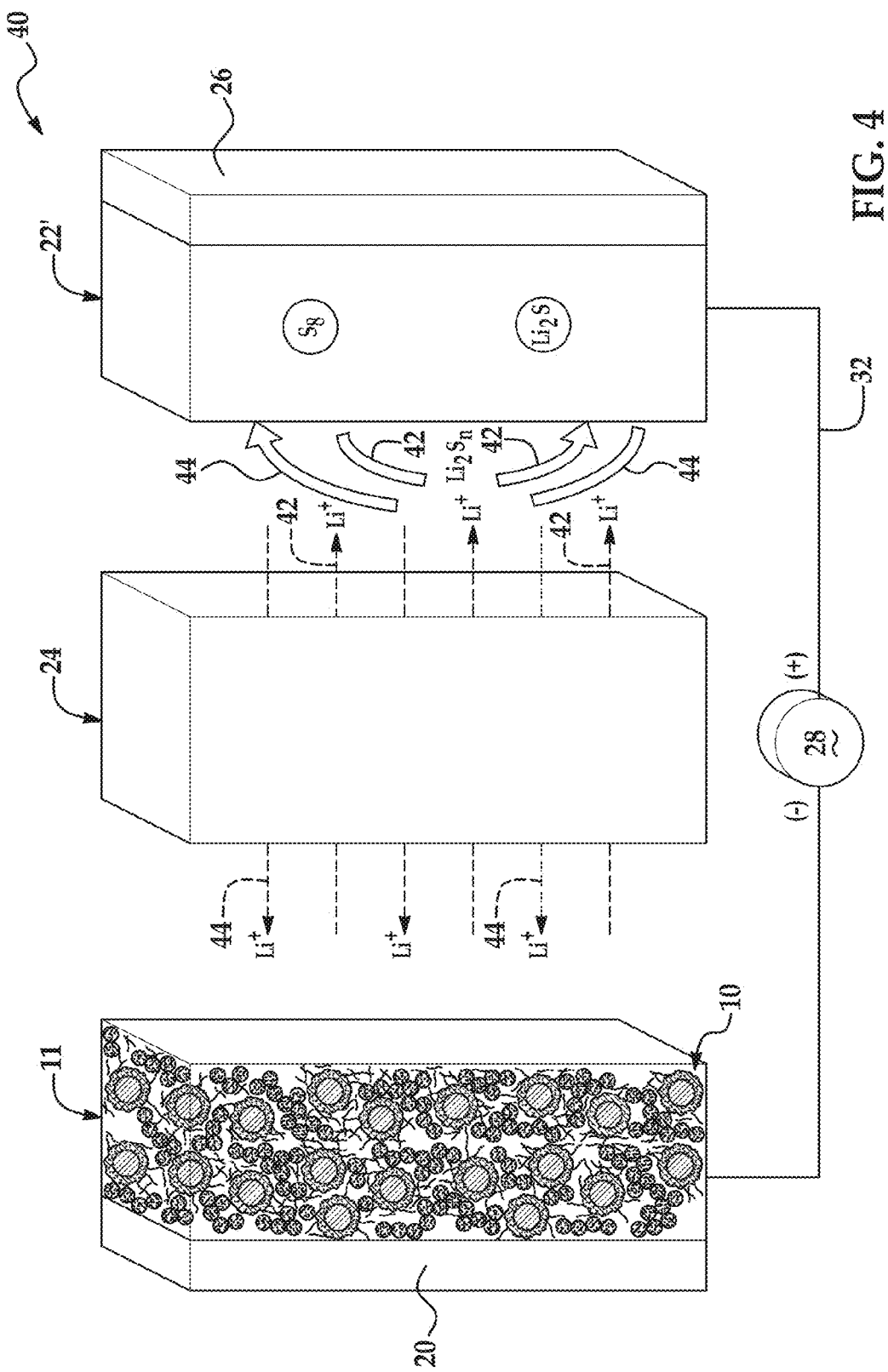
FIG. 4 is a perspective schematic view of an example of a lithium-sulfur battery, including an example of the negative electrode disclosed herein.

When pre-lithiation is complete, the lithiated negative electrode may be rinsed to remove any remaining pre-lithiation electrolyte, and then may be used in either the lithium ion battery 30 (FIG. 3) or the silicon-sulfur battery 40 (FIG. 4).

The active materials 10 of the negative electrode 11 can sufficiently undergo lithium insertion and deinsertion. As such, the negative electrode 11 formed on the support 20 (negative-side current collector) may be used in the lithium ion battery 30. An example of the lithium ion battery 30 is shown in FIG. 3.

In FIG. 3, the negative electrode 11 contains active material particles 10 that are composed of the silicon-based core 12 with the two-dimensional, layered mesoporous carbon coating 14 formed thereon. As shown in FIG. 3, the lithium ion battery 30 includes, in addition to the negative electrode 11 and the negative side current collector 20, a positive electrode 22, a positive-side current collector 26, and a porous separator 24 positioned between the negative electrode 11 and the positive electrode 22.

In FIG. 3, the positive electrode 22 may be formed from any lithium-based active material that can sufficiently undergo lithium insertion and deinsertion while aluminum or another suitable current collector 26 is functioning as the positive terminal of the lithium ion battery 30. One common class of known lithium-based active materials suitable for the positive electrode 22 includes layered lithium transitional metal oxides. Some specific examples of the lithium-based active materials include spinel lithium manganese oxide ($LiMn_2O_4$), lithium cobalt oxide ($LiCoO_2$), a nickel-manganese oxide spinel ($Li(Ni_{0.5}Mn_{1.5})O_2$), a layered nickel-manganese-cobalt oxide (having a general formula of $xLi_2MnO_3\cdot(1-x)LiMO_2$, where M is composed of any ratio of Ni, Mn and/or Co). A specific example of the layered nickel-manganese oxide spinel is $xLi_2MnO_3\cdot(1-x)Li(Ni_{1/3}Mn_{1/3}Co_{1/3})O_2$. Other suitable lithium-based active materials include $Li(Ni_{1/3}Mn_{1/3}Co_{1/3})O_2$, $LiNiO_2$, $Li_{x+y}Mn_{2-y}O_4$ (LMO, $0<x<1$ and $0<y<0.1$), or a lithium iron polyanion oxide, such as lithium iron phosphate ($LiFePO_4$) or lithium iron fluorophosphate ($Li_2FePO_4F$). Other lithium-based active materials may also be utilized, such as $LiNi_xM_{1-x}O_2$ (M is composed of any ratio of Al, Co, and/or Mg), $LiNi_{1-x}Co_{1-y}M_{x+y}O_2$ or $LiMn_{1.5-x}Ni_{0.5-y}M_{x+y}O_4$ (M is composed of any ratio of Al, Ti, Cr, and/or Mg), stabilized lithium manganese oxide spinel ($Li_xMn_{2-y}M_yO_4$, where M is composed of any ratio of Al, Ti, Cr, and/or Mg), lithium nickel cobalt aluminum oxide (e.g., $LiNi_{0.8}Co_{0.15}Al_{0.05}O_2$ or NCA), aluminum stabilized lithium manganese oxide spinel ($Li_xMn_{2-x}Al_yO_4$), lithium vanadium oxide ($LiV_2O_5$), $Li_2MSiO_4$ (M is composed of any ratio of Co, Fe, and/or Mn), and any other high efficiency nickel-manganese-cobalt material (HE-NMC, NMC or $LiNiMnCoO_2$). By "any ratio" it is meant that any element may be present in any amount. So, for example, M could be Al, with or without Co and/or Mg, or any other combination of the listed elements. In another example, anion substitutions may be made in the lattice of any example of the lithium transition metal based active material to stabilize the crystal structure. For example, any O atom may be substituted with an F atom.

The lithium-based active material of the positive electrode 22 may be intermingled with a polymeric binder and a high surface area carbon (i.e., conductive filler). Suitable binders include any of those listed for binder 16, such as polyvinylidene fluoride (PVdF), polyethylene oxide (PEO), an ethylene propylene diene monomer (EPDM) rubber, carboxymethyl cellulose (CMC)), styrene-butadiene rubber (SBR), styrene-butadiene rubber carboxymethyl cellulose (SBR-CMC), polyacrylic acid (PAA), cross-linked polyacrylic acid-polyethylenimine, polyimide, polyvinyl alcohol (PVA), sodium alginate, or other suitable binders. The polymeric binder structurally holds the lithium-based active materials and the high surface area carbon together. An example of the high surface area carbon is acetylene black. The high surface area carbon ensures electron conduction between the positive-side current collector 26 and the active material particles of the positive electrode 22.

The positive-side current collector 26 may be formed from aluminum or any other appropriate electrically conductive material known to skilled artisans.

The porous separator 24 in FIG. 3, which operates as both an electrical insulator and a mechanical support, is sandwiched between the negative electrode 11 and the positive electrode 22 to prevent physical contact between the two electrodes 11, 22 and the occurrence of a short circuit. In addition to providing a physical barrier between the two electrodes 11, 22, the porous separator 24 ensures passage of lithium ions (identified by the black dots and by the open circles having a (+) charge in FIG. 3) and related anions (identified by the open circles having a (−) charge in FIG. 3) through an electrolyte solution filling its pores. This helps ensure that the lithium ion battery 30 functions properly.

The porous separator 24 may be a polyolefin membrane. The polyolefin may be a homopolymer (derived from a single monomer constituent) or a heteropolymer (derived from more than one monomer constituent), and may be either linear or branched. If a heteropolymer derived from two monomer constituents is employed, the polyolefin may assume any copolymer chain arrangement, including those of a block copolymer or a random copolymer. The same holds true if the polyolefin is a heteropolymer derived from more than two monomer constituents. As examples, the polyolefin membrane may be formed of polyethylene (PE), polypropylene (PP), a blend of PE and PP, or multi-layered structured porous films of PE and/or PP.

In other examples, the porous separator 24 may be formed from another polymer chosen from polyethylene terephthalate (PET), polyvinylidene fluoride (PVdF), polyamides (Nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, acrylonitrile-butadiene styrene copolymers (ABS), polystyrene copolymers, polymethylmethacrylate (PMMA), polyvinyl chloride (PVC), polysiloxane polymers (such as polydimethylsiloxane (PDMS)), polybenzimidazole (PBI), polybenzoxazole (PBO), polyphenylenes (e.g., PARMAX™ (Mississippi Polymer Technologies, Inc., Bay Saint Louis, Miss.)), polyarylene ether ketones, polyperfluorocyclobutanes, polytetrafluoroethylene (PTFE), polyvinylidene fluoride copolymers and terpolymers, polyvinylidene chloride, polyvinylfluoride, liquid crystalline polymers (e.g., VECTRAN™ (Hoechst AG, Germany), ZENITE® (DuPont, Wilmington, Del.), poly(p-hydroxybenzoic acid), polyaramides, polyphenylene oxide, and/or combinations thereof. In yet another example, the porous separator 24 may be chosen from a combination of the polyolefin (such as PE and/or PP) and one or more of the polymers listed above.

The porous separator 24 may contain a single layer or a multi-layer laminate fabricated from either a dry or wet process. For example, a single layer of the polyolefin and/or other listed polymer may constitute the entirety of the porous separator 24. As another example, however, multiple discrete layers of similar or dissimilar polyolefins and/or polymers may be assembled into the porous separator 24. In one example, a discrete layer of one or more of the polymers may be coated on a discrete layer of the polyolefin to form the porous separator 24. Further, the polyolefin (and/or other polymer) layer, and any other optional polymer layers, may further be included in the porous separator 24 as a fibrous layer to help provide the porous separator 24 with appropriate structural and porosity characteristics. Still other suitable porous separators 24 include those that have a ceramic layer attached thereto, and those that have ceramic filler in the polymer matrix (i.e., an organic-inorganic composite matrix).

Any appropriate electrolyte solution that can conduct lithium ions between the negative electrode 11 and the positive electrode 22 may be used in the lithium ion battery 30. In one example, the electrolyte solution may be a non-aqueous liquid electrolyte solution that includes a lithium salt dissolved in an organic solvent or a mixture of organic solvents. Examples of lithium salts that may be dissolved in the organic solvent to form the non-aqueous liquid electrolyte solution include $LiClO_4$, $LiAlCl_4$, $LiI$, $LiBr$, $LiB(C_2O_4)_2$ (LiBOB), $LiBF_2(C_2O_4)$ (LiODFB), $LiSCN$, $LiBF_4$, $LiB(C_6H_5)_4$, $LiAsF_6$, $LiCF_3SO_3$, $LiN(FSO_2)_2$(LIFSI), $LiN(CF_3SO_2)_2$(LITFSI), $LiPF_6$, $LiPF_4(C_2O_4)$ (LiFOP), $LiNO_3$, $LiPF_3(C_2F_5)_3$ (LiFAP), $LiPF_4(CF_3)_2$, $LiPF_3(CF_3)_3$, and mixtures thereof. These and other similar lithium salts may be dissolved in a variety of organic solvents, such as cyclic carbonates (ethylene carbonate, propylene carbonate, butylene carbonate, fluoroethylene carbonate), linear carbonates (dimethyl carbonate, diethyl carbonate, ethylmethyl carbonate), aliphatic carboxylic esters (methyl formate, methyl acetate, methyl propionate), γ-lactones (γ-butyrolactone, γ-valerolactone), chain structure ethers (1,2-dimethoxyethane, 1-2-diethoxyethane, ethoxymethoxyethane, tetraglyme), cyclic ethers (tetrahydrofuran, 2-methyltetrahydrofuran, 1,3-dioxolane), and mixtures thereof.

As shown in FIG. 3, the lithium ion battery 30 also includes an interruptible external circuit 32 that connects the negative electrode 11 and the positive electrode 22. The lithium ion battery 30 may also support a load device 28 that can be operatively connected to the external circuit 32. The load device 28 receives a feed of electrical energy from the electric current passing through the external circuit 32 when the lithium ion battery 30 is discharging. While the load device 28 may be any number of known electrically-powered devices, a few specific examples of a power-consuming load device 28 include an electric motor for a hybrid vehicle or an all-electrical vehicle, a laptop computer, a cellular phone, and a cordless power tool. The load device 28 may also, however, be an electrical power-generating apparatus that charges the lithium ion battery 30 for purposes of storing energy. For instance, the tendency of windmills and solar panels to variably and/or intermittently generate electricity often results in a need to store surplus energy for later use.

The lithium ion battery 30 may also include a wide range of other components that, while not depicted here, are nonetheless known to skilled artisans. For instance, the lithium ion battery 30 may include a casing, gaskets, terminals, tabs, and any other desirable components or materials that may be situated between or around the negative electrode 11 and the positive electrode 22 for performance-related or other practical purposes. Moreover, the size and shape of the lithium ion battery 30, as well as the design and chemical make-up of its main components, may vary depending on the particular application for which it is designed. Battery-powered automobiles and hand-held consumer electronic devices, for example, are two instances where the lithium ion battery 30 would most likely be designed to different size, capacity, and power-output specifications. The lithium ion battery 30 may also be connected in series and/or in parallel with other similar lithium ion batteries to produce a greater voltage output and current (if arranged in parallel) or voltage (if arranged in series) if the load device 28 so requires.

The lithium ion battery 30 generally operates by reversibly passing lithium ions between the negative electrode 11 and the positive electrode 22. In the fully charged state, the voltage of the battery 30 is at a maximum (typically in the range 1.5V to 5.0V); while in the fully discharged state, the voltage of the battery 30 is at a minimum (typically in the range 0V to 1.5V). Essentially, the Fermi energy levels of the active materials in the positive and negative electrodes 22, 11 change during battery operation, and so does the difference between the two, known as the battery voltage. The battery voltage decreases during discharge, with the Fermi levels getting closer to each other. During charge, the reverse process is occurring, with the battery voltage increasing as the Fermi levels are being driven apart. During battery discharge, the external load device 28 enables an electronic current flow in the external circuit 32 with a direction such that the difference between the Fermi levels (and, correspondingly, the cell voltage) decreases. The reverse happens during battery charging: the battery charger forces an electronic current flow in the external circuit 32 with a direction such that the difference between the Fermi levels (and, correspondingly, the cell voltage) increases.

At the beginning of a discharge, the negative electrode 11 of the lithium ion battery 30 contains a high concentration of intercalated lithium while the positive electrode 22 is relatively depleted. When the negative electrode 11 contains a sufficiently higher relative quantity of intercalated lithium, the lithium ion battery 30 can generate a beneficial electric current by way of reversible electrochemical reactions that occur when the external circuit 32 is closed to connect the negative electrode 11 and the positive electrode 22. The establishment of the closed external circuit under such circumstances causes the extraction of intercalated lithium from the negative electrode 11. The extracted lithium atoms are split into lithium ions (identified by the black dots and by the open circles having a (+) charge) and electrons (e⁻) as they leave an intercalation host at the negative electrode-electrolyte interface.

The chemical potential difference between the positive electrode 22 and the negative electrode 11 (ranging from about 1.5V to about 5.0V, depending on the exact chemical make-up of the electrodes 11, 22) drives the electrons (e⁻) produced by the oxidation of intercalated lithium at the negative electrode 11 through the external circuit 32 towards the positive electrode 22. The lithium ions are concurrently carried by the electrolyte solution through the porous separator 24 towards the positive electrode 22. The electrons (e⁻) flowing through the external circuit 32 and the lithium ions migrating across the porous separator 24 in the electrolyte solution eventually reconcile and form intercalated lithium at the positive electrode 22. The electric current passing through the external circuit 32 can be harnessed and directed through the load device 28 until the level of intercalated lithium in the negative electrode 11 falls below a workable level or the need for electrical energy ceases.

The lithium ion battery 30 may be recharged after a partial or full discharge of its available capacity. To charge the lithium ion battery 30 an external battery charger is connected to the positive and the negative electrodes 22, 11, to drive the reverse of battery discharge electrochemical reactions. During recharging, the electrons (e⁻) flow back towards the negative electrode 11 through the external circuit 32, and the lithium ions are carried by the electrolyte across the porous separator 24 back towards the negative electrode 11. The electrons (e⁻) and the lithium ions are reunited at the negative electrode 11, thus replenishing it with intercalated lithium for consumption during the next battery discharge cycle.

The external battery charger that may be used to charge the lithium ion battery 30, may vary depending on the size, construction, and particular end-use of the lithium ion battery 30. Some suitable external battery chargers include a battery charger plugged into an AC wall outlet and a motor vehicle alternator.

Referring now to FIG. 4, an example of a lithium (or silicon)-sulfur battery 40 with the negative electrode 11 described herein is shown. The lithium-sulfur battery 40 contains the negative electrode 11, the negative side current collector 20, a positive electrode 22', a positive-side current collector 26, and a porous separator 24 positioned between the negative electrode 11 and the positive electrode 22'. It is to be understood that the porous separator 24 may be the same type of porous separator 24 that is used in a lithium ion battery 30 described herein. In addition, the negative current collector 20 and positive current collector 26 described herein for the lithium ion battery 30 may also be used in the lithium-sulfur battery 40.

For the lithium-sulfur battery 40, the electrolyte solution includes an ether based solvent and a lithium salt dissolved in the ether based solvent. Examples of the ether based solvent include cyclic ethers, such as 1,3-dioxolane, tetrahydrofuran, 2-methyltetrahydrofuran, and chain structure ethers, such as 1,2-dimethoxyethane, 1-2-diethoxyethane, ethoxymethoxyethane, tetraethylene glycol dimethyl ether (TEGDME), polyethylene glycol dimethyl ether (PEGDME), and mixtures thereof. Examples of the lithium salt include $LiClO_4$, $LiAlCl_4$, LiI, LiBr, $LiB(C_2O_4)_2$ (LiBOB), $LiBF_2(C_2O_4)$ (LiODFB), LiSCN, $LiBF_4$, $LiB(C_6H_5)_4$, $LiAsF_6$, $LiCF_3SO_3$, $LiN(FSO_2)_2$(LIFSI), $LiN(CF_3SO_2)_2$(LITFSI), $LiPF_6$, $LiPF_4(C_2O_4)$ (LiFOP), $LiNO_3$, $LiPF_3(C_2F_5)_3$ (LiFAP), $LiPF_4(CF_3)_2$, $LiPF_3(CF_3)_3$, and mixtures thereof.

For the lithium-sulfur battery 40, the positive electrode 22' may include any sulfur-based active material that can sufficiently undergo lithium alloying and dealloying with aluminum or another suitable current collector functioning as the positive terminal of the lithium-sulfur battery 40. Examples of sulfur-based active materials include $S_8$, $Li_2S_8$, $Li_2S_6$, $Li_2S_4$, $Li_2S_2$, and $Li_2S$. Another example of sulfur-based active material includes a sulfur-carbon composite. In an example, the weight ratio of S to C in the positive electrode 22' ranges from 1:9 to 9:1.

The sulfur-based active material of the positive electrode 22' may be intermingled with the polymer binder and the conductive filler. Suitable binders include any of those previously described for binder 16. The polymer binder structurally holds the sulfur-based active material and the conductive filler together. An example of the conductive filler is a high surface area carbon, such as acetylene black or activated carbon. The conductive filler ensures electron conduction between the positive-side current collector 26 and the sulfur-based active material. In an example, the positive electrode active material and the polymer binder may be encapsulated with carbon.

The positive and negative electrodes 22', 11 are in contact, respectively, with current collectors 26, 20. The negative-side current collector 20 collects and moves free electrons to and from the external circuit 32. The positive-side current collector 26 collects and moves free electrons to and from the external circuit 32.

The lithium-sulfur battery 40 may support a load device 28 that can be operatively connected to the external circuit 32. The load device 28 receives a feed of electrical energy from the electric current passing through the external circuit 32 when the lithium-sulfur battery 40 is discharging. While the load device 28 may be any number of known electrically-powered devices, a few specific examples of a power-consuming load device include an electric motor for a hybrid vehicle or an all-electrical vehicle, a laptop computer, a cellular phone, and a cordless power tool. The load device 28 may also, however, be an electrical power-generating apparatus that charges the lithium-sulfur battery 40 for purposes of storing energy. For instance, the tendency of windmills and solar panels to variably and/or intermittently generate electricity often results in a need to store surplus energy for later use.

The lithium-sulfur battery 40 can include a wide range of other components that, while not depicted here, are nonetheless known to skilled artisans. For instance, the lithium-sulfur battery 40 may include a casing, gaskets, terminals, tabs, and any other desirable components or materials that may be situated between or around the negative electrode 11 and the positive electrode 22' for performance-related or other practical purposes. Moreover, the size and shape of the lithium-sulfur battery 40, as well as the design and chemical make-up of its main components, may vary depending on the particular application for which it is designed. Battery-powered automobiles and hand-held consumer electronic devices, for example, are two instances where the lithium-sulfur battery 40 would most likely be designed to different size, capacity, and power-output specifications. The lithium-sulfur battery 40 may also be connected in series and/or in parallel with other similar lithium-sulfur batteries 40 to produce a greater voltage output and current (if arranged in parallel) or voltage (if arranged in series) if the load device 28 so requires.

The lithium-sulfur battery 40 can generate a useful electric current during battery discharge (shown by reference numeral 42 in FIG. 4). During discharge, the chemical processes in the battery 40 include lithium (Li$^+$) dissolution from the surface of the negative electrode 11 and incorporation of the lithium cations into alkali metal polysulfide salts (i.e., Li$_2$S$_n$) in the positive electrode 22'. As such, polysulfides are formed (sulfur is reduced) on the surface of the positive electrode 22' in sequence while the battery 40 is discharging. The chemical potential difference between the positive electrode 22' and the negative electrode 11 (ranging from approximately 1.5V to 3.0V, depending on the exact chemical make-up of the electrodes 11, 22') drives electrons produced by the dissolution of lithium at the negative electrode 11 through the external circuit 32 towards the positive electrode 22'. The resulting electric current passing through the external circuit 32 can be harnessed and directed through the load device 28 until the lithium in the negative electrode 11 is depleted and the capacity of the lithium-sulfur battery 40 is diminished.

The lithium-sulfur battery 40 can be charged or re-powered at any time by applying an external power source to the lithium-sulfur battery 40 to reverse the electrochemical reactions that occur during battery discharge. During charging (shown at reference numeral 44 in FIG. 4), lithium plating to the negative electrode 11 takes place, and sulfur formation at the positive electrode 22' takes place. The connection of an external power source to the lithium-sulfur battery 40 compels the otherwise non-spontaneous oxidation of lithium at the positive electrode 22' to produce electrons and lithium ions. The electrons, which flow back towards the negative electrode 11 through the external circuit 32, and the lithium ions (Li$^+$), which are carried by the electrolyte across the porous membrane 24 back towards the negative electrode 11, reunite at the negative electrode 11 and replenish it with lithium for consumption during the next battery discharge cycle. The external power source that may be used to charge the lithium-sulfur battery 40 may vary depending on the size, construction, and particular end-use of the lithium-sulfur battery 40. Some suitable external power sources include a battery charger plugged into an AC wall outlet and a motor vehicle alternator.

To further illustrate the present disclosure, an example is given herein. It is to be understood that this example is provided for illustrative purposes and is not to be construed as limiting the scope of the present disclosure.

EXAMPLES

Example 1

In one example, a mixture of triethynylbenzene and diiodobenzene were added to THF. A combination of tetrakis (triphenylphosphine)palladium(0) and copper iodide, as the catalysts, were also added to THF to form a mixture. The molar ratio of monomers to catalysts was about 9:1 respectively. The concentration of monomers in the solvent was about 100 mg per 100 mL. The silicon powder (i.e., silicon-based core material) was also added to the mixture in a mass ratio of silicon to monomer of about 4:1. A flow of nitrogen gas was directed through the mixture, and the mixture was heated to 40° C. for about 8 hours. This reaction formed a polymer coating on the silicon powder particles, where the polymer coating had a thickness of about 20 nm.

The resulting product (i.e., the coated silicon powder particles) was then subjected to a heat treatment to carbonize the polymer coating. The product was heat treated at a temperature of about 600° C. for about 5 hours. The heat treatment formed the active material including the mesoporous carbon coating 14 on the silicon powder.

Figure 5A:
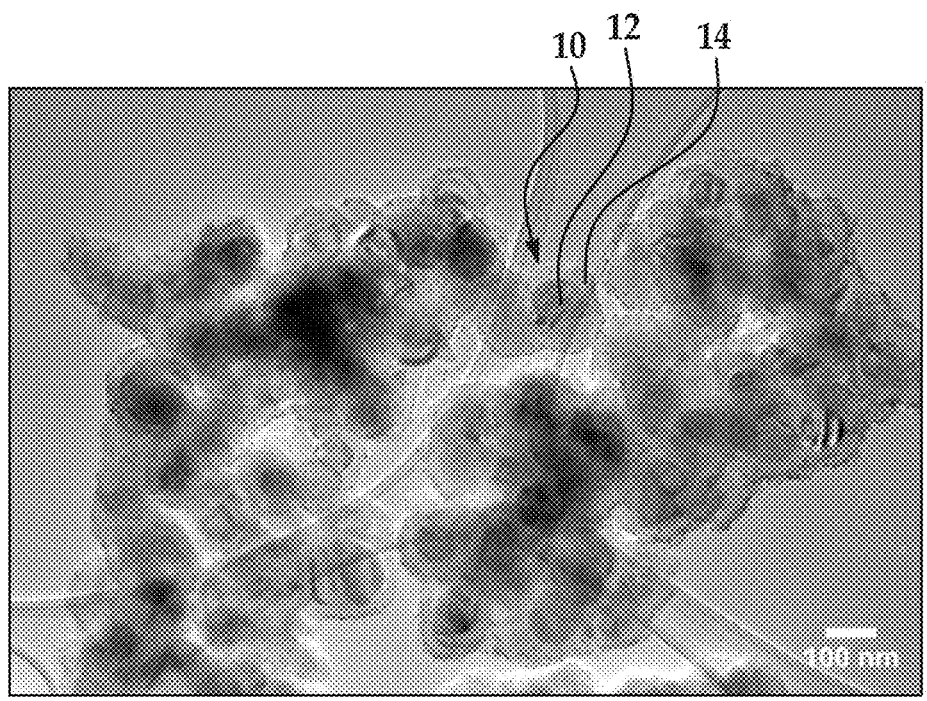
FIGS. 5A and 5B are scanning transmission electron microscope ("STEM") images, using a scalar bar of 100 nm, of examples of the active material prepared from an example of the method disclosed herein.
Figure 5B:
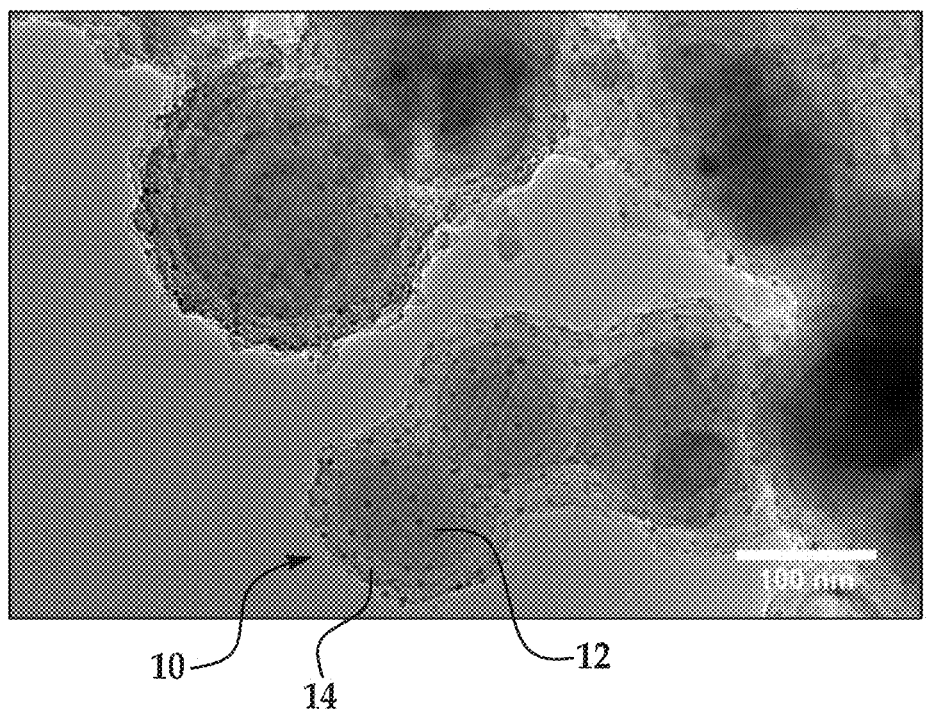

STEM images of the final active material 10 were taken. FIGS. 5A and 5B are STEM images of the active material 10 including the silicon-based core 12 and the two-dimensional, layered mesoporous carbon coating 14. It is to be understood that the dark spots in FIG. 5B are residual catalysts. It is also to be understood that pores are present in the various layers of the mesoporous carbon coating 14. However, the pores are not visible in the STEM images as a result of the layered structure.

Example 2

The active material of Example 1 was used as the active material to form an example negative electrode and untreated silicon powder was used as the active material to form a comparative negative electrode. The example electrode slurry was formed by adding 85 wt % (of the total solids) of the active material of Example 1, 10 wt % (of the total solids) of sodium alginate as the binder, and 5 wt % (of the total solids) of carbon black as the conductive filler to water. The comparative electrode slurry was formed by adding 80 wt % (of the total solids) of untreated silicon powder as the active material, 10 wt % (of the total solids) of sodium alginate as the binder, and 10 wt % (of the total solids) of carbon black as the conductive filler to water. Each slurry was cast on a respective copper current collector and dried by exposure to a vacuum at 80° C. for about 10 hours to remove the water and form the example and comparative electrodes.

Each electrode was cut into a 10 mm (in diameter) disk for use as a single electrode in a respective coin cell. In the single electrodes, the loading of the respective active materials was about 1 mg/cm$^2$ of pure silicon.

The example coin cell included the example negative electrode formed with the example active material, and a lithium foil counter electrode. The comparative example coin cell included the comparative example electrode formed with the untreated silicon powder, and a lithium foil counter electrode. Each of the example and comparative coin cells was prepared with an electrolyte of 1M LiPF$_6$ in ethylene carbonate (EC)-diethyl carbonate (DEC) (1:1 v:v) and 10% FEC.

The example and comparative coin cells were held at 25° C. to perform electrochemical cycling tests. The cycling tests were carried out at a rate of 0.2 C, and the coin cells were cycled within the voltage window of 0.05V to 1V for at least 50 cycles.

Figure 6:
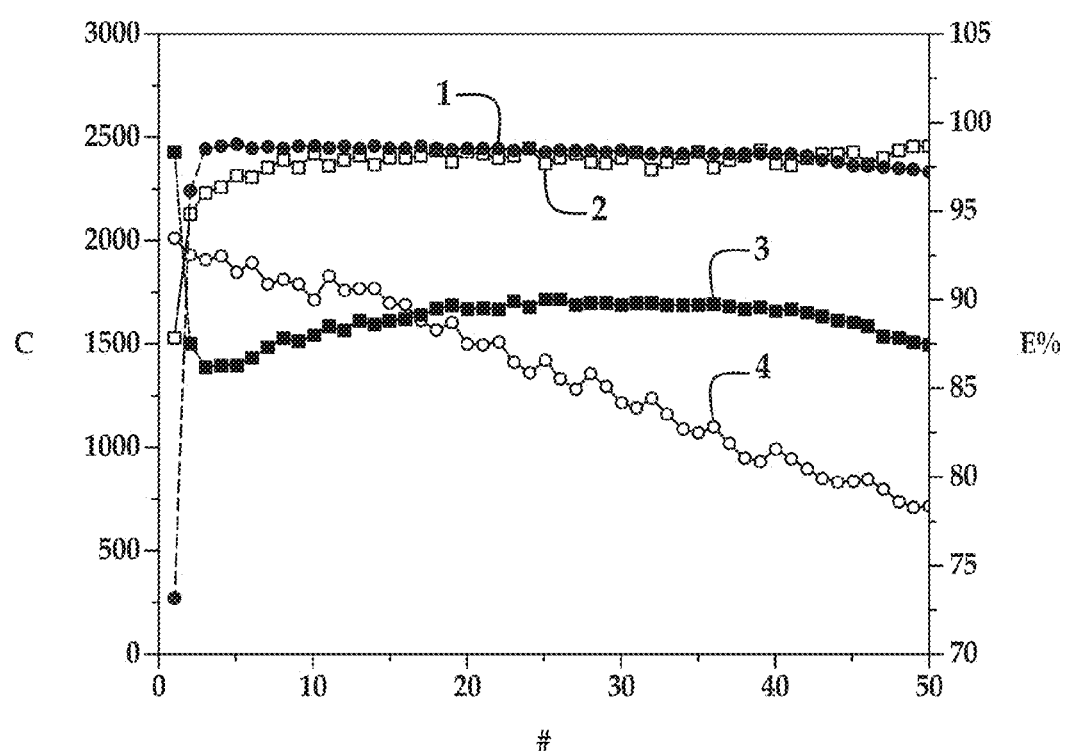
FIG. 6 is a graph exhibiting the cycling stability, in terms of capacity retention and efficiency, of a coin cell including a negative electrode formed with an example of the active material disclosed herein (i.e., silicon nanopowder coated with a two-dimensional, layered mesoporous carbon coating) and of a comparative coin cell including a negative electrode formed with a comparative active material (i.e., the silicon nanopowder without any coating thereon).

FIG. 6 depicts the Coulombic efficiency (%) (Y axis labeled "E %" on the right side) versus the cycle number (X axis labeled "#") of the coin cells. The efficiency of the example coin cell is labeled "1" and the efficiency of the comparative coin cell is labeled "2". FIG. 6 also depicts the capacity (mAh/g) (Y axis labeled "C" on the left side) versus the cycle number (X axis labeled "#") of the coin cells. The capacity of the example coin cell during discharge is labeled "3" and the capacity of the comparative coin cell during discharge is labeled "4".

As illustrated in FIG. 6, the cycling stability of the example coin cell during a repeated lithiation (charging) and delithiation (discharging) process was improved compared to the comparative example coin cell. In particular, the discharge capacity (3) of the example coin cell is much higher than the discharge capacity (4) of the comparative coin cell from about 15 cycles through 50 cycles. The efficiency (1) of the example coin cell was at least equal to or slightly higher than the efficiency (2) of the comparative coin cell up to about 40 cycles. It is believed that the cycling stability of the example coin cell is improved, in part, because of the flexible and elastic structure of the two-dimensional, layered mesoporous carbon coating 14. The mesoporous carbon coating 14 protects the silicon-based core 12 of the active material, and thus enables the active material to better accommodate silicon expansion during cycling. This prevents or at least reduces fracturing, decrepitating, or mechanical degradation of the active material in the example coin cell.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

It is to be understood that the ranges provided herein include the stated range and any value or sub-range within the stated range. For example, a range from about 2 nm to about 50 nm should be interpreted to include not only the explicitly recited limits of from about 2 nm to about 50 nm, but also to include individual values, such as 5 nm, 20 nm, 35 nm, etc., and sub-ranges, such as from about 10 nm to about 18 nm; from about 15 nm to about 40 nm, etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A negative electrode, comprising:
   an active material, including:
      a silicon-based core; and
      a layered mesoporous carbon coating in continuous contact with the silicon-based core, the layered mesoporous carbon coating conformally coating the silicon-based core and to expand and contract with the silicon-based core,
         wherein the layer mesoporous carbon coating is formed from a combination of monomers selected from the group consisting of i) triethynylbenzene and diiodobenzene, ii) triethynylbenzene and dibromobenzene, iii) diethynylbenzene and triiodobenzene, iv) diethynylbenzene and tribromobenzene, v) p-divinylbenzene and tribromobenzene, and vi) benzene-1,4-diboronic acid and tribromobenzene; and
   a binder.

2. The negative electrode as defined in claim 1 wherein the silicon-based core has a diameter ranging from about 5 nm to about 50 μm, and the layered mesoporous carbon coating has a total thickness ranging from about 5 nm to about 250 nm.

3. The negative electrode as defined in claim 1 wherein the layered mesoporous carbon coating has pores, and wherein each of the pores has a pore diameter ranging from about 2 nm to about 50 nm.

4. The negative electrode as defined in claim 1, excluding an additional conductive filler.

5. The negative electrode as defined in claim 1 wherein the layered mesoporous carbon coating is formed in situ on the silicon-based core.

6. The negative electrode as defined in claim 1 wherein:
   the active material is present in an amount ranging from about 70 wt % to about 95 wt % of a total wt % of the negative electrode;
   the binder is present in an amount ranging from about 5 wt % to about 30 wt % of the total wt % of the negative electrode; and
   the negative electrode further includes a conductive filler present in an amount ranging from greater than 0 wt % to about 30 wt %.

7. The negative electrode as defined in claim 1 wherein the binder is selected from the group consisting of polyvinylidene fluoride (PVdF), polyethylene oxide (PEO), an ethylene propylene diene monomer (EPDM) rubber, carboxymethyl cellulose (CMC), styrene-butadiene rubber (SBR), styrene-butadiene rubber carboxymethyl cellulose (SBR-CMC), polyacrylic acid (PAA), cross-linked polyacrylic acid-polyethylenimine, polyimide, polyvinyl alcohol (PVA), poly(acrylamide-co-diallyl dimethyl ammonium chloride), sodium alginate, and combinations thereof.

8. A lithium-based battery, comprising:
   a positive electrode;
   a negative electrode, including:
      an active material, including:
         a silicon-based core; and
         a layered mesoporous carbon coating in continuous contact with the silicon-based core, the layered mesoporous carbon coating conformally coating the silicon-based core and to expand and contract with the silicon-based core,
            wherein the layer mesoporous carbon coating is formed from a combination of monomers selected from the group consisting of i) triethynylbenzene and diiodobenzene, ii) triethynylbenzene and dibromobenzene, iii) diethynylbenzene and triiodobenzene, iv) diethynylbenzene and tribromobenzene, v) p-divinylbenzene and tribromobenzene, and vi) benzene-1,4-diboronic acid and tribromobenzene; and
      a binder; and
   a microporous polymer separator soaked in an electrolyte solution, the microporous polymer separator being disposed between the positive electrode and the negative electrode.

9. The lithium-based battery as defined in claim 8 wherein:
   the positive electrode includes a lithium transition metal oxide based active material selected from the group consisting of $LiMn_2O_4$, $Li(Ni_{0.5}Mn_{1.5})O_2$, $Li(Ni_{1/3}Mn_{1/3}Co_{1/3})O_2$, $LiCoO_2$, $LiFePO_4$, $Li_2MSiO_4$ (M composed of any ratio of Co, Fe, and Mn), and a high efficiency nickel-manganese-cobalt material; and
   the electrolyte solution includes an organic solvent and a lithium salt dissolved in the organic solvent, the organic solvent being selected from the group consisting of cyclic carbonates, linear carbonates, aliphatic carboxylic esters, γ-lactones, chain structure ethers, cyclic ethers, and mixtures thereof, and the lithium salt being selected from the group consisting of $LiClO_4$, $LiAlCl_4$, LiI, LiBr, $LiB(C_2O_4)_2$(LiBOB), $LiBF_2(C_2O_4)$(LiODFB), LiSCN, $LiBF_4$, $LiB(C_6H_5)_4$, $LiAsF_6$, $LiCF_3SO_3$, $LiN(FSO_2)_2$(LIFSI), $LiN(CF_3SO_2)_2$ (LITFSI), $LiPF_6$, $LiPF_4(C_2O_4)$(LiFOP), $LiNO_3$, $LiPF_3(C_2F_5)_3$(LiFAP), $LiPF_4(CF_3)_2$, $LiPF_3(CF_3)_3$, and mixtures thereof.

10. The lithium-based battery as defined in claim 8 wherein the silicon-based core has a diameter ranging from about 5 nm to about 50 μm, and the layered mesoporous carbon coating has a total thickness ranging from about 5 nm to about 250 nm.

11. The lithium-based battery as defined in claim 8 wherein the layered mesoporous carbon coating has pores, and wherein each of the pores has with a pore diameter ranging from about 2 nm to about 10 nm.

12. The lithium-based battery as defined in claim 8, wherein the negative electrode excludes an additional conductive filler.

13. The lithium-based battery as defined in claim 8 wherein the layered mesoporous carbon coating is formed in situ on the silicon-based core.

14. The lithium-based battery as defined in claim 8 wherein:
the active material is present in an amount ranging from about 70 wt % to about 95 wt % of a total wt % of the negative electrode;
the binder is present in an amount ranging from about 5 wt % to about 30 wt % of the total wt % of the negative electrode; and
the negative electrode further includes a conductive filler present in an amount ranging from greater than 0 wt % to about 30 wt %.

15. The lithium-based battery as defined in claim 8 wherein the binder is selected from the group consisting of polyvinylidene fluoride (PVdF), polyethylene oxide (PEO), an ethylene propylene diene monomer (EPDM) rubber, carboxymethyl cellulose (CMC)), styrene-butadiene rubber (SBR), styrene-butadiene rubber carboxymethyl cellulose (SBR-CMC), polyacrylic acid (PAA), cross-linked polyacrylic acid-polyethylenimine, polyimide, polyvinyl alcohol (PVA), poly(acrylamide-co-diallyl dimethyl ammonium chloride), sodium alginate, and combinations thereof.

16. A method for making a negative electrode active material, comprising:
mixing a silicon-based core and a mesoporous polymer precursor in the presence of a catalyst, whereby the mesoporous polymer precursor polymerizes in situ to form a layered mesoporous polymer coating that conformally coats the silicon-based core; and
heat treating the silicon-based core conformally coated with the layered mesoporous polymer coating, thereby carbonizing the layered mesoporous polymer coating to form a mesoporous carbon coating on the silicon-based core.

17. The method as defined in claim 16 wherein the mesoporous polymer precursor includes a combination of monomers selected from the group consisting of i) triethynylbenzene and diiodobenzene, ii) triethynylbenzene and dibromobenzene, iii) diethynylbenzene and triiodobenzene, iv) diethynylbenzene and tribromobenzene, v) p-divinylbenzene and tribromobenzene, and vi) benzene-1,4-diboronic acid and tribromobenzene.

18. The method as defined in claim 16 wherein the mixing is accomplished at a temperature ranging from about 18° C. to about 100° C., and wherein the heat treating is accomplished at a temperature ranging from about 300° C. to about 900° C.

19. The method as defined in claim 16 wherein the catalyst includes a combination of tetrakis(triphenylphosphine)palladium(0) and copper iodide or bis(triphenylphosphine)palladium(II) dichloride and copper iodide.

20. The method as defined in claim 16 wherein the mixing is accomplished in an ether based solvent under an inert gas flow.

* * * * *